C. H. LEINERT.
VALVE FOR COMPRESSORS.
APPLICATION FILED OCT. 30, 1920.
1,404,130.  Patented Jan. 17, 1922.
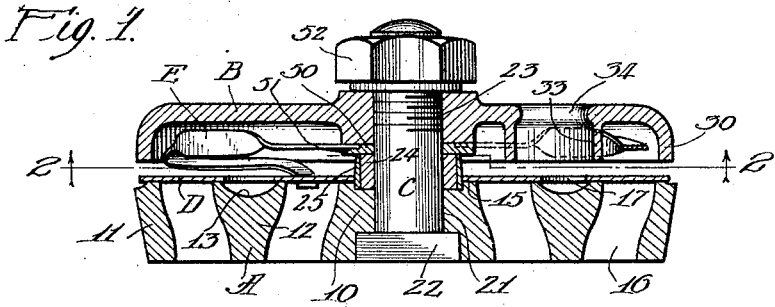
Fig. 1.
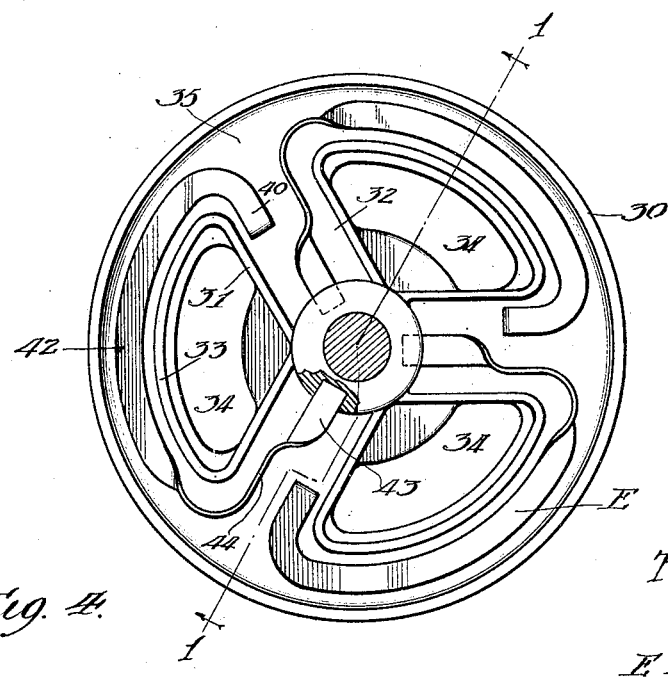
Fig. 2.
Fig. 4.
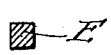
Fig. 5.
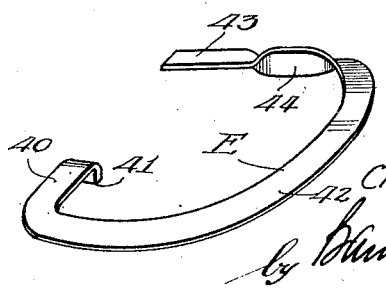
Fig. 3.
Witness:
Stephen F. Hebra
Inventor.
Charles H. Leinert
by Hunning & Hunning
Attys

UNITED STATES PATENT OFFICE.

CHARLES H. LEINERT, OF CHICAGO, ILLINOIS.

VALVE FOR COMPRESSORS.

1,404,130.     Specification of Letters Patent.     Patented Jan. 17, 1922.

Application filed October 30, 1920. Serial No. 420,798.

*To all whom it may concern:*

Be it known that I, CHARLES H. LEINERT, a citizen of the United States, residing at Chicago, in the county of Cook and State of Illinois, have invented certain new and useful Improvements in Valves for Compressors, of which the following is a specification.

This invention relates to a valve, either suction or discharge, which is particularly adapted for use with compressors. It is of the general kind shown and described in my Patent No. 1,240,461 and in my pending application Serial No. 409,369, filed September 10, 1920. In its construction the present valve embodies certain features of novelty to which reference will hereinafter be made. More particularly I have aimed in this invention to employ spring means for the valve which may be accommodated within a small space and yet possess a desirable degree of tension, and to provide means for facilitating the assembly and retention of such springs within the valve structure. Various other objects and advantages are hereinafter described in the specification, wherein reference is made to the accompanying drawing which exhibits one embodiment of my invention in the manner following:

Figure 1 is a transverse section taken on line 1—1 of Fig. 2, showing a discharge valve;

Fig. 2 is a horizontal section taken on line 2—2 of Fig. 1;

Fig. 3 is a perspective view of one of the springs detached from the valve; and

Figs. 4 and 5 represent other cross sectional forms which the springs may take.

The blowers of the type to which this invention particularly relates are usually employed for the discharge of relatively large volumes of air at comparatively low pressure, and such blowers are generally operated at a relatively high speed, so that the check valves controlling the inlet and discharge ports for air are also reciprocated at comparatively high speed. Owing to the conditions mentioned, the check valves are subjected to hard usage such as to cause their frequent wearing out, and necessitating their consequent renewal. It is accordingly an object of this invention to provide for this kind of service a check valve which is cheap, efficient, and which may be easily and quickly repaired, or renewed whenever necessary, without shutting down the operation of the compressor for any extended period.

Referring now particularly to Figs. 1 and 2, I have shown therein a discharge valve which consists of a seat member A adapted to attach directly to the compressor or to a wall surrounding the same, a spring abutment member B connected to the seat member through the medium of a bolt C, a valve plate D interposed between the two members, and spring means E arranged to hold the valve plate D normally upon its seat. The parts just enumerated are the only ones which enter into the construction of this valve, but they are specially formed to cooperate with each other in a peculiar manner all as will now be explained.

The seat member A which lies inwardly of the other is formed to provide a hub 10, a rim 11, and an intermediate circular wall 12 having in its outer face an annular groove 13. The outer face of the rim 11 also constitutes a seat for the valve D which preferably consists of a thin disk of sheet metal or other suitable material. The valve plate is also adapted to seat upon a flange 15 formed on the hub of the member A and upon the edges bordering the annular groove 13 of the wall 12, this latter part being connected to the rim and to the hub as by means of spokes 16 in a well known manner. Through the valve plate are formed arc-shaped openings 17 which are disposed to lie between the edges of the annular groove 13 in the manner common to this type of valve.

I provide within the hub 10 an axial bore 21 to receive the bolt C whose head 22 is disposed within an enlarged portion of the bore in flush relation with the inner face of the member A. The bolt also extends through an axial opening 23 in the outer or abutment member B and through a collar 24 which is interposed between the seat and spring members A and B respectively. Surrounding the collar is a sleeve 25 which may be made of brass or any other suitable material, this sleeve being tapered for practically its entire length toward the end which lies adjacent the abutment member B. The plate D which is centrally apertured to receive the sleeve 25 is centered in place upon the member A by means of this sleeve, but is disengaged therefrom as soon as it is lifted from off its seat.

The abutment member B whose construction may best be understood by reference to Fig. 2 is formed with a peripheral flange 30 extending toward the valve plate for a slight distance, and is further provided with other flanges 31 which define shallow channels 32 extending in a radial direction. The number of such channels, according to the construction shown, is three. An arc-shaped flange 33 extends between the outer ends of each pair of diverging flanges 31 and within each space thus bounded is an arcuate opening 34. Between the circular flange 30 and the arc-shaped flanges 33 lies a shallow annular channel 35 communicating with the other radial channels 32, as shown.

The valve plate D is normally held away from the member B by spring means in leaf form, one being provided for each radial channel. The springs may have the cross sectional form that is shown in Figs. 1 and 3, that is, they may be made of flat material; or they may be square, as shown in Fig. 4, or round, as illustrated in Fig. 5. Each spring is formed at one end with a relatively straight section 40 which extends radially within the channel 32, the spring extremity 41 being formed to engage with the valve plate D in any approved manner; an arcuate-shaped section 42 extending within the annular channel 35; and a third section 43 which extends toward the center of the valve within the adjacent channel 32, this last section, in the case of the spring shown in Fig. 3, having a portion 44 of itself twisted in right-angular relation to the remainder of the spring body. It will be noted that one of the flat sides of the spring faces the valve, from which it results that a desirable degree of resiliency may be afforded to the spring. With each movement of the valve plate toward the abutment member B, the spring tends to straighten out flatwise of itself, but may not otherwise yield. Under these conditions the end sections 40 and 43 are liable to be unduly strained in resisting the consequent tendency to spread further apart. Due to the provision of the twisted portion 44, the spring may flex outwardly as required to relieve any strain of this character. This is an important consideration in a valve designed for the service mentioned where its checking movements are very fast. In the case of a spring having the cross-sectional form of either Fig. 4 or Fig. 5, the necessity for such a twist in its body would hardly obtain, as the spring would have capacity for yielding in any direction.

The end of each spring which lies adjacent the member B may be secured to a plate 50 in the form of a washer which rests between the abutment member and collar 24, as shown in Fig. 1. Within this plate may be formed recesses 51, one for the end of each spring, and connection of the several springs with this plate may be made by spot-welding or otherwise.

According to the construction described, the springs utilized in the present valve, irrespective of their cross-sectional form, are relatively flat, their shape being such as to provide two sections which lie within different channels 32, and an intermediate arc-shaped section which lies within the annular channel adjacent the periphery of the abutment member. Each spring is, of course, suitably shaped and treated to exert a desired tension upon the valve plate so as to hold it to its seat. The assembly and retention of these springs within the valve is also a matter of the utmost ease inasmuch as they may be handled, together with the valve plate D, as a unit and be secured detachably in place simply by means of a nut 52 with its associated parts. Furthermore I would have it noted that the channels formed on the inner side of the abutment member are such as to receive each of the three springs even when contracted to the fullest extent, and by slightly offsetting the outer end of each spring, as shown, interference is avoided with the opposite spring end during contraction.

I claim:

1. In a valve of the kind described, the combination of an open member formed to provide a seat, a valve plate adapted to rest upon the seat, a second member connected with the first, and spring means interposed between the valve plate and the second member consisting of a plurality of independent springs each having one end secured to the valve plate and extending for a distance adjacent its periphery and then radially toward the center of the valve for attachment to the second member, the several springs being adapted to flex in any direction, substantially as described.

2. In a valve of the kind described, the combination of a seat member, a valve plate adapted to rest thereupon, an abutment member connected with the seat member, there being formed in the side of the abutment member facing the valve an annular peripheral channel and radial channels connected therewith, and spring means interposed between the valve plate and abutment member, the spring means consisting of a plurality of independent springs each having one end secured adjacent the abutment member near its center and extending radially therefrom in line with one of its channels to the peripheral channel and thence around to another radial channel and thence inwardly to connect with the valve plate, substantially as described.

3. In a valve of the kind described, the combination of an open member formed to provide a seat, a valve plate adapted to rest upon the seat, a second member connected with the first and formed on its side which faces the valve with a plurality of radial channels each of which communicates with a peripheral channel, there being openings through the abutment member between the radial channels, and spring means consisting of a plurality of independent springs each having one end secured near the center of the abutment member and extending thence toward the periphery of the member in line with one of its radial channels, and thence circularly in line with its peripheral channel, and thence radially again toward the center in line with another radial channel to connect with the valve plate, the connection of each spring at its end adjacent the abutment member including a plate to which each of the springs are secured, and means for removably holding said plate in fixed relation to the abutment member, substantially as described.

4. In a valve of the kind described, the combination of a seat member, a valve plate adapted to seat thereupon, an abutment member, a bolt connection between the seat and abutment members, and spring means interposed between the valve plate and abutment member including a plurality of springs each operatively related to the valve plate, and each adapted to flex in any desired direction, and a single means connecting each of said springs, said means being held in place by the bolt connection aforesaid, substantially as described.

5. In a valve of the kind described, the combination of a seat member, a valve plate adapted to seat thereupon, an abutment member, a connection between the seat and spring members, and abutment means interposed between the valve plate and abutment member and operatively related to each, each spring means being formed with a flat body having a general curvature flatwise of itself with a portion of its body twisted in right angular relation thereto, whereby the spring may flex in any direction, substantially as described.

6. In a valve of the kind described, the combination of a seat member, a valve plate adapted to rest thereupon, an abutment member connected with the seat member, there being formed in the side of the abutment member facing the valve an annular peripheral channel and radial channels connected therewith, and spring means interposed between the valve plate and abutment member and operatively related to each, each spring means consisting of a flat body extending radially from the middle portion of the spring member in line with one of its channels to the peripheral channel and thence around to another radial channel and thence inwardly toward the center of the valve plate, the body of the spring within one of the radial channels being twisted in right angular relation to permit flexing of the spring in a direction transverse to the axis of the valve, substantially as described.

CHARLES H. LEINERT.

Witness:
EPHRAIM BANNING.